Patented July 24, 1934

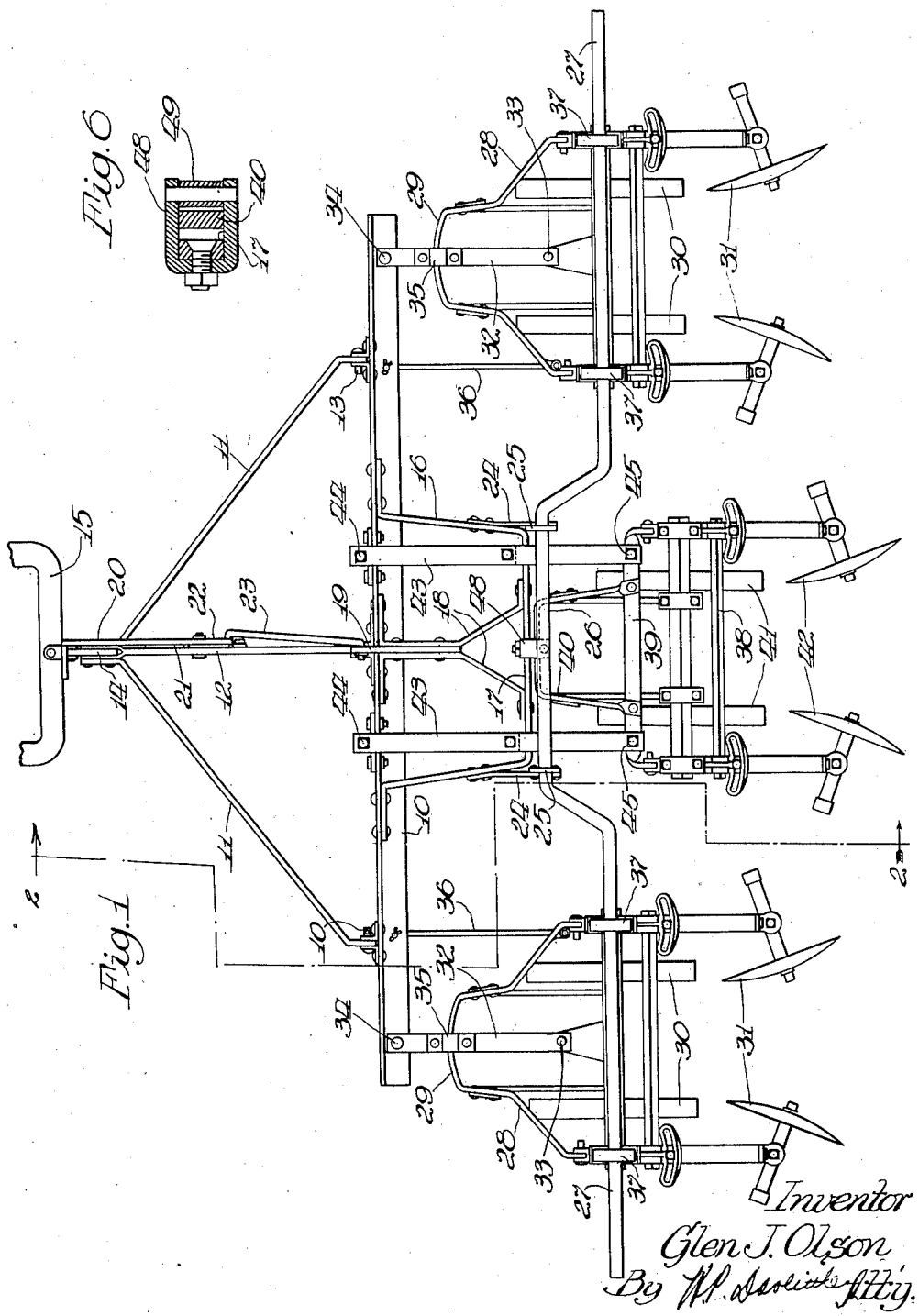

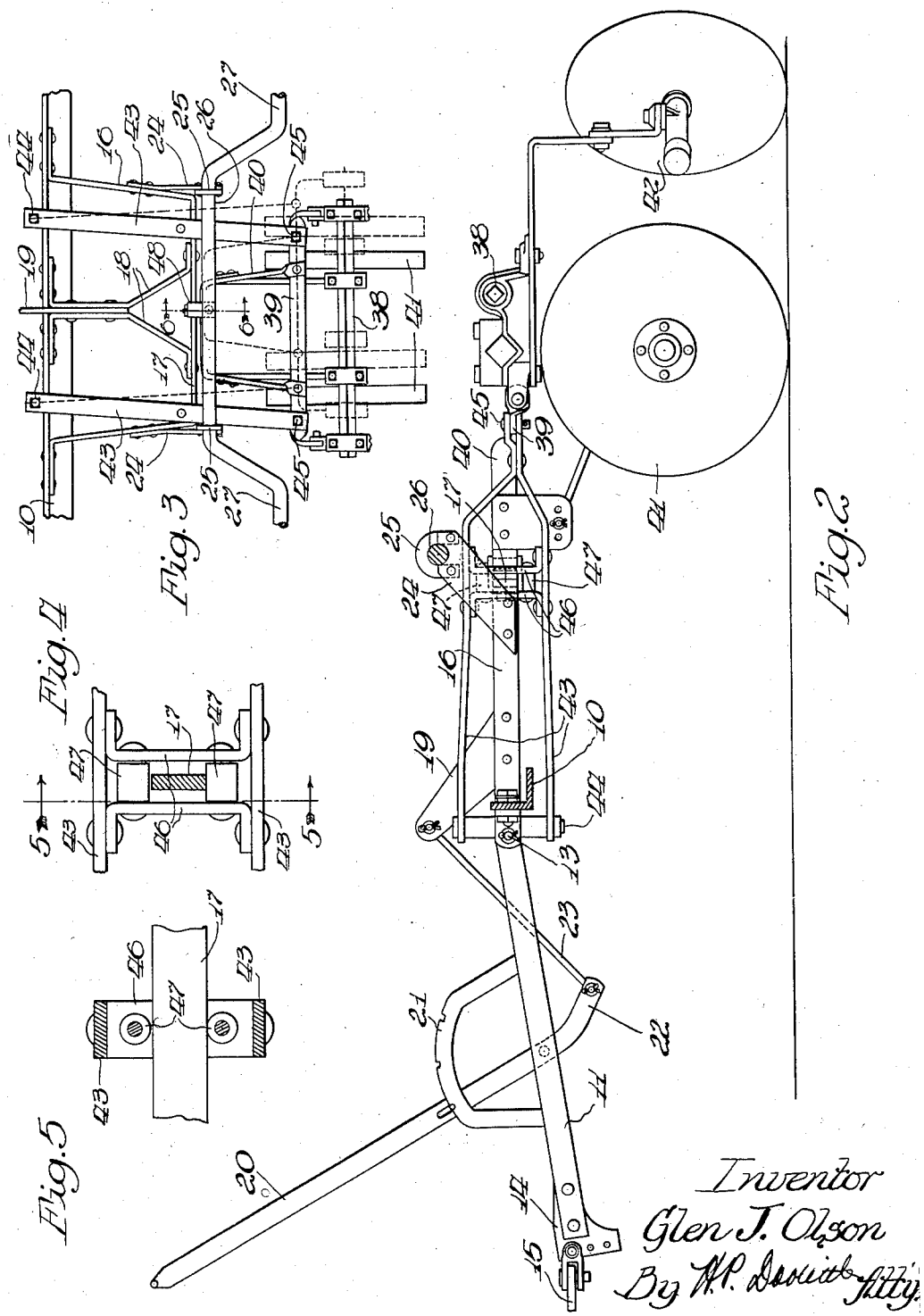

1,967,321

UNITED STATES PATENT OFFICE 1,967,321

TRACTOR LISTER CULTIVATOR

Glen J. Olson, Canton, Ill., assignor to International Harvester Company, a corporation of New Jersey Application May 24, 1933, Serial No. 672,623

5 Claims. (Cl. 97—143)

The invention relates to lister cultivators of the multiple unit type adapted to be drawn by tractors.

The principal object of the invention is to provide a tractor drawn multiple unit lister cultivator in which the several lister units will be free to follow the furrows or ridges on which they are respectively working and which are so connected to each other and to a common draft frame as to remain in upright position and in parallel relation to each other and to the line of travel of the cultivator as a whole as they shift laterally to follow deviations in the furrows.

Other objects and features of advantage will become evident from the following description of a preferred embodiment of the invention illustrated in the accompanying drawings, where:

Figure 1 is a plan view of the cultivator trailing from a tractor drawbar;

Figure 2 is an enlarged vertical section on line 2—2 of Figure 1;

Figure 3 is a detail plan view of the central portion of the cultivator shown in Figure 1;

Figure 4 is a detail of a slidable connection between the central unit and the draft frame;

Figure 5 is the same detail viewed on line 5—5 of Figure 4; and,

Figure 6 is a sectional detail on the line 6—6 of Figure 3.

As herein disclosed the cultivator embodying the invention has a draft frame comprising an elongated transverse bar 10 to which forwardly extending, converging hitch bars 11 and a central bar 12 are pivotally connected on a horizontal axis, as at 13. The connected ends of the hitch bar are secured to the usual clevis 14, which is adapted to be connected to the drawbar of a tractor shown in part at 15. The central portion of the transverse bar 10 has secured to it a rearwardly extending support which is preferably composed of a U-shaped frame bar having its arms 16 riveted or otherwise secured to the rear face of the transverse bar 10 and its rear transverse portion 17 extending parallel to said bar. Central brace bars 18 connect the draft bar 10 with the crossbar 17 of the supporting frame. The brace bars 18 carry an upstanding fixed arm 19 which preferably extends forwardly, as shown in Figure 2. The central member 12 of the draft frame has pivoted to it a vertical hand lever 20 co-operating with a locking rack 21. The lever 20 has an arm 22 extending below the draft frame, and this arm is pivotally connected by a link 23 with the arm 19. The rear ends of the arms 16 of the supporting frame have secured thereto upwardly extending bearing brackets 24 terminating in aligned cylindrical bearings 25 which are located above the level of the supporting frame. These bearings rotatably receive the central offset portion 26 of a transversely extending cylindrical guide bar, the arms 27 of which extend laterally beyond the draft member 10 in parallel relation thereto. Each end of the transverse draft member 10 has connected to it a lister cultivator unit of a conventional type comprising a frame 28 formed with a forwardly bowed portion 29 and supported on a pair of furrow guide wheels 30. The usual soil engaging elements, such as the disks 31, are located rearwardly of the furrow wheels. Each of these outward or laterally disposed cultivator units is connected to the bar 10 by a main draft tongue 32 pivoted at 33 to the frame 28 and similarly pivoted at 34 to the bar 10. Intermediate its ends the draft tongue 32 is provided with a guide loop 35 slidably engaging the bowed portion 29 of the lister frame. In laterally spaced relation to the tongue 32 each unit is provided with an auxiliary draft link 36 parallel to the tongue 32 and similarly pivoted to the frame of the lister unit and to the member 10. A parallel draft link connection is thus established between each of the outer or laterally disposed units and the draft member. Each outer lister unit is provided with laterally spaced bearing brackets 37 which slidably receive the respective ends 27 of the guide bar.

The construction so far described would afford and could be used as a two row lister in which the laterally spaced units are guided on a transverse bar and are restricted to substantially rectilinear lateral movement. As the offset central portion of the guide bar is rotatably mounted in a fixed support, some vertical movement of the units is possible on the loose pivotal connections thereof to the bar 10 and each unit will be held in upright position and prevented from tilting by reason of its slidable connection to the guide bar. In its preferred form, however, the structure includes a central lister unit having a frame 38 including a forward crossbar 39 carrying a forwardly extending bowed member 40, the forward portion of which lies adjacent the rear crossbar 17 of the supporting frame. This unit is supported on furrow guide wheels 41, like those of the laterally disposed units, behind which are located the soil engaging disks 42. This unit is connected to the central portion of the transverse draft member 10 between the arms 16 of the supporting frame by means of parallel draft links 43 which are preferably formed of twin superposed bars seen in Figure 2, which straddle the bars of the rearwardly extended supporting frame and extend rearwardly thereof to their point of connection to the transverse bar 39 of the lister unit. The parallel links 43 are connected to vertical pivots 44 on the member 10 at their forward ends and to pivots 45 on the lister unit at their rear ends. Where the spaced bars of the parallel draft links 43 straddle the rear crossbar 17 of the supporting frame, they are connected by spaced upright pieces 46 (Figure 4) carrying vertically spaced rollers 47 engaging the upper and lower edges of the crossbar 17. At its center the bar 17 of the supporting frame has secured to it a guide bracket 48 (Figure 6) which has parallel arms between which a roller 49 is mounted. The arms of the bracket embrace the transverse portion of the arched member 40 of the lister frame and the bracket serves to guide the lateral movements of the unit.

The above manner of mounting the central unit permits it to have limited lateral movement, as indicated in dotted lines on Figures 1 and 3, while the unit is maintained in upright position at all times.

The soil engaging tools of all three units may be raised and lowered in unison by movements of the hand lever 20 on the draft frame. Rearward movement of this lever will cause the draft member 10 to be moved downwardly, thereby rocking the lister units on their supporting wheels and elevating the tools at the rear thereof, and vice versa.

The foregoing structure provides a simple, strong and efficient multiple row lister cultivator in which each unit is capable of independent lateral movement on substantially straight lines without departing from parallel relation to the other units and to the direction of travel, the cultivator as a whole being particularly well adapted for free trailing movement and operation behind a tractor.

Modifications in the preferred structure disclosed may, of course, be made without departure from the scope of the invention as defined in the following claims.

What is claimed is:

1. A lister cultivator comprising a draft frame including an elongated transverse bar, a supporting structure comprising a U-shaped member with its arms secured to the central portion of said transverse bar to extend rearwardly, laterally spaced bearings on the rear portion of the U-shaped member, a single transversely extending guide bar having a central portion forwardly offset from its end portions and rotatably mounted in said bearings, laterally disposed lister units connected to the transverse bar of the draft frame for lateral movement, and laterally spaced bearings on each unit slidably receiving the end portions of the guide bar.

2. A lister cultivator comprising a draft frame including an elongated transverse bar, a frame structure secured to the central portion of said transverse bar to extend rearwardly, said frame structure including laterally spaced arms connected at the rear ends by a crossbar, a single transversely extending guide bar having its central portion supported in bearings on the rear end of said frame structure, a central lister unit positioned rearwardly of said frame structure, laterally spaced parallel draft links connecting the unit with the transverse bar for lateral movement, guideways on said draft links slidably engaging the crossbar on the frame structure, and lateral lister units connected to the transverse bar of the draft frame for lateral movement and having guiding connections with the guide bar.

3. A lister cultivator comprising a draft frame including an elongated transverse bar, a rearwardly extending U-shaped frame member having its arms fixed to the central portion of the transverse member, a single transversely extending guide bar having a central offset portion journaled in bearings on the rear end of the U-shaped frame member, laterally disposed lister units connected to the transverse bar of the draft frame for lateral movement, laterally spaced bearings on each unit slidably receiving the end portions of the guide bar, and a central lister unit connected to the transverse bar of the draft frame between the arms of the U-shaped frame member.

4. A lister cultivator comprising a draft frame including an elongated transverse bar, a rearwardly extending U-shaped frame member having its arms fixed to the central portion of the transverse member, a single transversely extending guide bar having a central offset portion journaled in bearings on the rear end of the U-shaped frame member, laterally disposed lister units connected to the transverse bar of the draft frame for lateral movement, laterally spaced bearings on each unit slidably receiving the end portions of the guide bar, and a central lister unit having laterally spaced parallel draft links connected by vertical pivots to the transverse member of the draft frame between the arms of the U-shaped frame member, said draft links having intermediate portions slidably engaging the transverse portion of the U-shaped frame.

5. A lister cultivator comprising a draft frame having an elongated transverse bar and forwardly extending hitch bars pivotally connected to the transverse bar and adapted for connection to a tractor drawbar, a frame structure secured to the central portion of said transverse bar to extend rearwardly, a single transversely extending guide bar having its central portion supported on the rear end of said frame structure, laterally disposed wheel supported lister units connected to the transverse member of the draft frame for lateral movement, laterally spaced bearings on each unit slidably receiving the end portions of the guide bar, a central wheel supported lister unit connected to the transverse bar rearwardly of said frame structure by laterally spaced parallel draft links having vertical pivots on the transverse bar and unit respectively, a vertical hand lever pivoted between its ends on the draft frame, an upstanding arm on the frame structure, and a link connecting the lower end of the lever with said arm.

GLEN J. OLSON.